Aug. 19, 1952 S. K. WELLMAN ET AL 2,607,245

METHOD AND APPARATUS FOR SHAPING BIMETALLIC BLANKS

Filed March 23, 1945 6 Sheets-Sheet 1

INVENTORS:
SAMUEL K. WELLMAN
FRANCIS J. LOWEY
BY
C. Thomas Cox
ATTORNEY.

METHOD AND APPARATUS FOR SHAPING BIMETALLIC BLANKS

Filed March 23, 1945

INVENTORS:
SAMUEL K. WELLMAN
FRANCIS J. LOWEY.
BY C. Thomas Cox
ATTORNEY

METHOD AND APPARATUS FOR SHAPING BIMETALLIC BLANKS

Filed March 23, 1945 6 Sheets-Sheet 3

INVENTORS:
SAMUEL K. WELLMAN
FRANCIS J. LOWEY
BY C. Thomas Cox
ATTORNEY

METHOD AND APPARATUS FOR SHAPING BIMETALLIC BLANKS

Filed March 23, 1945 6 Sheets-Sheet 4

INVENTORS:
SAMUEL K. WELLMAN
FRANCIS J. LOWEY
BY
C. Thomas Cox
ATTORNEY.

Aug. 19, 1952 S. K. WELLMAN ET AL 2,607,245

METHOD AND APPARATUS FOR SHAPING BIMETALLIC BLANKS

Filed March 23, 1945 6 Sheets-Sheet 5

INVENTORS:
SAMUEL K. WELLMAN
FRANCIS J. LOWEY
BY C. Thomas Cox
ATTORNEY.

Aug. 19, 1952 S. K. WELLMAN ET AL 2,607,245

METHOD AND APPARATUS FOR SHAPING BIMETALLIC BLANKS

Filed March 23, 1945 6 Sheets-Sheet 6

INVENTORS:
SAMUEL K. WELLMAN
FRANCIS J. LOWEY
BY C. Thomas Cox
ATTORNEY.

Patented Aug. 19, 1952

2,607,245

UNITED STATES PATENT OFFICE 2,607,245

METHOD AND APPARATUS FOR SHAPING BIMETALLIC BLANKS

Samuel K. Wellman, Cleveland Heights, and Francis J. Lowey, Bay Village, Ohio, assignors to The S. K. Wellman Company, Cleveland, Ohio, a corporation of Ohio Application March 23, 1945, Serial No. 584,434

9 Claims. (Cl. 80—31.1)

This invention relates to method and apparatus for the controlled bending to conical shape of bimetallic articles having layers of different plasticity.

Bimetallic articles having layers of different plasticity are in quite common use as machine elements. Articles of this type may be a solid metal backing member to which is integrally bonded a sintered facing of a mixture of metallic and non-metallic powders. Such articles have found increasing use as friction and anti-friction machine elements for use as bearings and for use as brake and clutch friction members. The facing material possesses characteristics not obtainable with solid metal articles and as a result has found many unique applications. For certain uses of such articles it is necessary to bend or form them to curved configuration, as where the article is to form an annular bearing or a curved brake shoe facing. This is often difficult due to the low tensile strength of the sintered metal facing and its tendency to crack and chip when placed in tension. This is particularly true when attempts are made to bend a flat bimetallic article to curved configuration with the sintered facing disposed on the outer or convex face of the solid metal backing member. Numerous attempts have been made to devise satisfactory apparatus and methods for doing this. One satisfactory solution is set forth in Wellman Patent No. 2,289,311, issued July 7, 1942. A new and improved method based on the progressive, mechanical working of successive lateral areas of the sintered metal facing of an elongated bimetallic blank to elongate the facing and cause the bimetallic article to bend, is set forth in the pending applications of F. J. Lowey et al., S. N. 489,132, filed May 31, 1942, now Patent No. 2,404,808, granted July 30, 1946, and of S. K. Wellman, S. N. 555,116, filed September 21, 1944.

The present invention is concerned with the utilization in a differential manner of the principle of progressive, mechanical working to form a bimetallic article in a controlled manner to a predetermined conical shape.

It is an object of our invention to provide a novel apparatus for the controlled bending of bimetallic articles having layers of different plasticity to a predetermined conical shape characterized by the employment of pressure rolls, at least one of which has a conical shape.

It is a further object of our invention to provide an improved apparatus for the controlled bending of bimetallic articles to a conical shape without scuffing or tearing the surface and which gives uniform results regardless of physical variations in the articles.

It is a still further object of our invention to provide a new and improved method by which bimetallic articles may be accurately and rapidly bent or otherwise formed to a desired conical shape.

Other and further objects and advantages of our invention will be apparent from the following description and the accompanying drawings, in which.

Figures 1, 2:
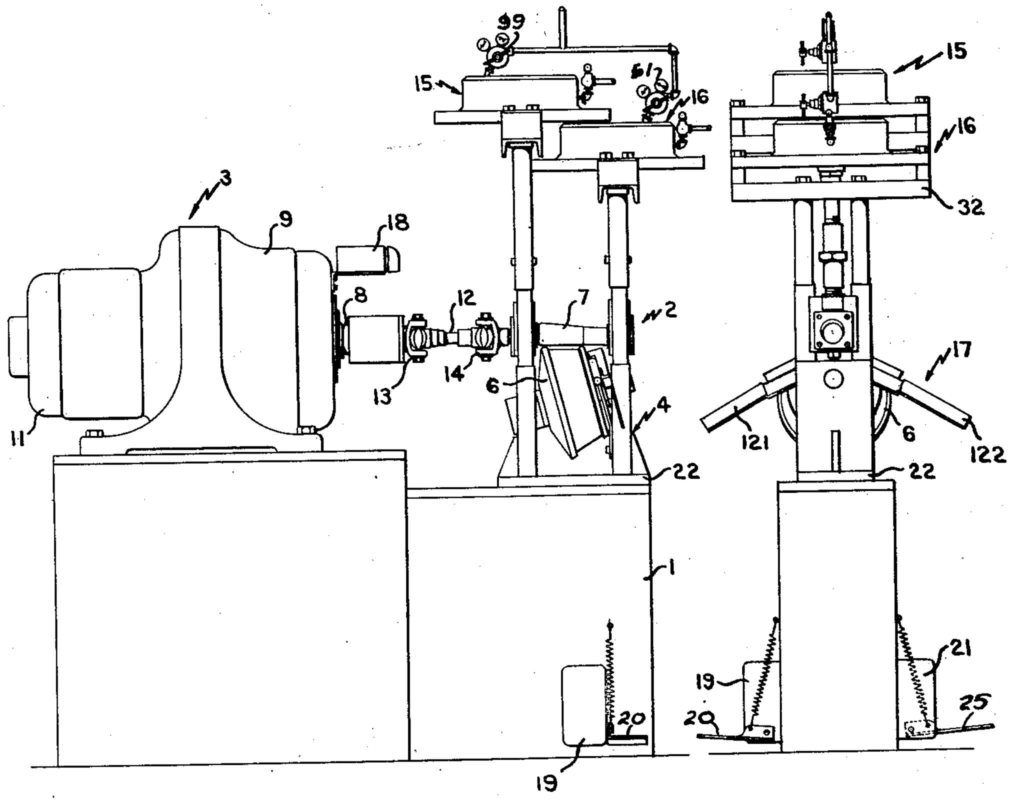
Fig. 1 is a front elevation of our improved apparatus for shaping bimetallic articles.
Fig. 2 is an elevation of the right end of the apparatus of Fig. 1.

Referring now to Figs. 1 and 2, the main elements of the apparatus will be generally identified before describing them in detail. It will be seen that the apparatus comprises a base 1 on which is mounted a roll bending unit generally indicated at 2, and a motor drive generally indicated at 3. The roll bending unit 2 comprises a frame generally indicated at 4 in which is rotatably mounted the idler roll 6 and the drive roll 7. Both rolls have conical rolling surfaces and have their axes located in the same plane. It will be observed that the small ends of the rolling surfaces are adjacent each other and that the roll axes are inclined to each other. For convenience, roll 6 is designated as a conical roll and roll 7 as a drive roll. The drive roll 7 is connected through the telescoping shaft 12 and universal joints 13 and 14 to the driving shaft 8 of a reduction gearing unit 9 integral with the electric motor 11.

The drive roll 7 is mounted in the frame 4 in bearings which are capable of vertical movement. Pressure applying units generally indicated at 15 and 16 are mounted on the upper end of the frame 4 and are operatively connected with the bearings of the roll 7, all as will be described in greater detail hereafter. The conical roll 6 is freely rotatable in fixed bearings carried in the frame 4.

The work to be bent by the machine is fed between the two rolls 6 and 7, the rotation of the drive roll by the motor 11 serving to feed the blank between the rolls and to rotate the lower conical roll 6. A starting device generally designated as 17 is provided for the conical roll 6 to aid in starting the work between the rolls.

Suitable mechanical controls are provided for the operators of the apparatus. Thus, the pressure applying units 15 and 16 are provided with suitable control valves to adjust the pressure applied to the drive roll 7. The electric motor 11 carries a master switch 18 which selectively connects the foot switches 19 and 21 with the source of electrical energy.

Figure 3:
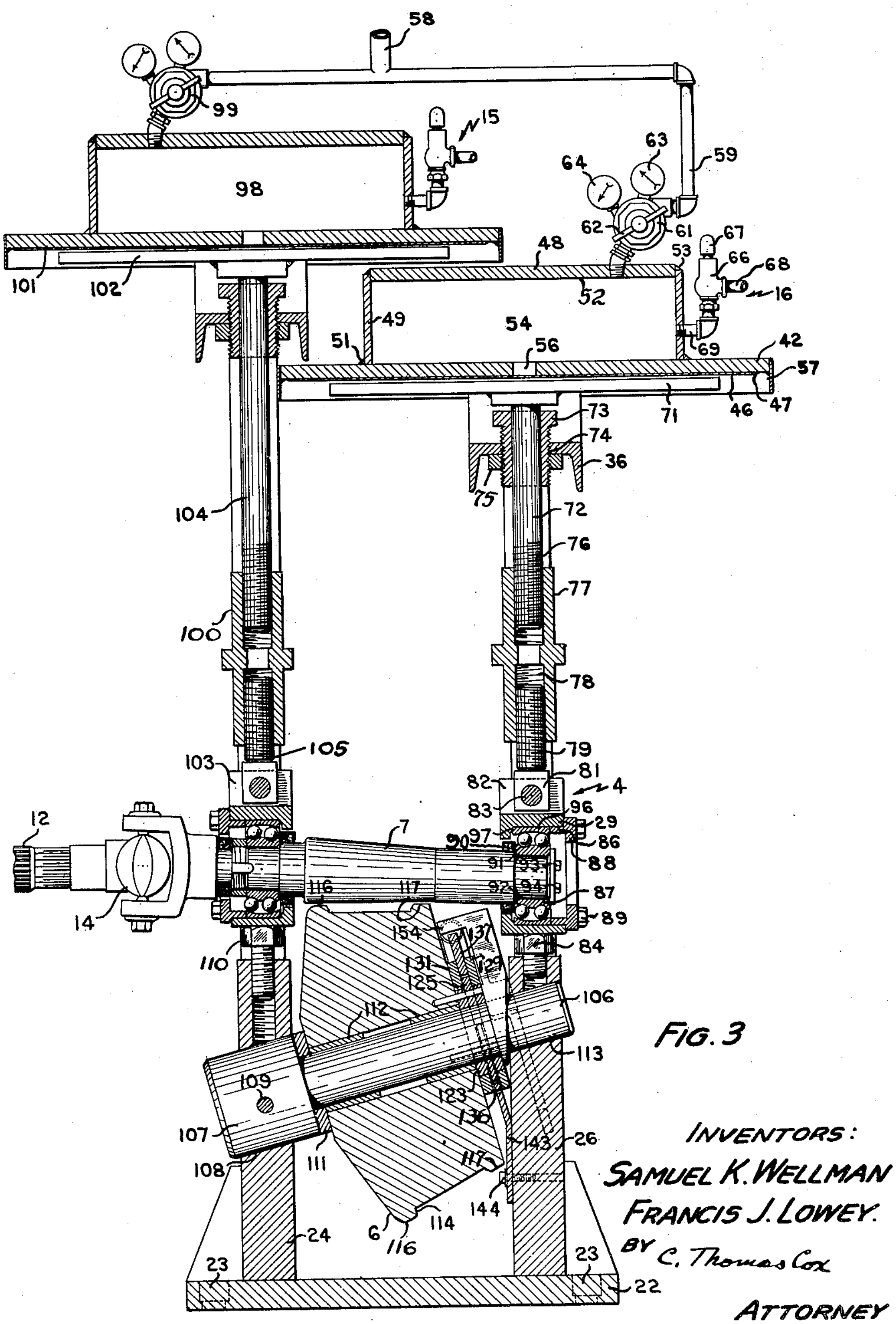
Fig. 3 is a vertical section on line 3—3 of Fig. 4.
Figure 4:
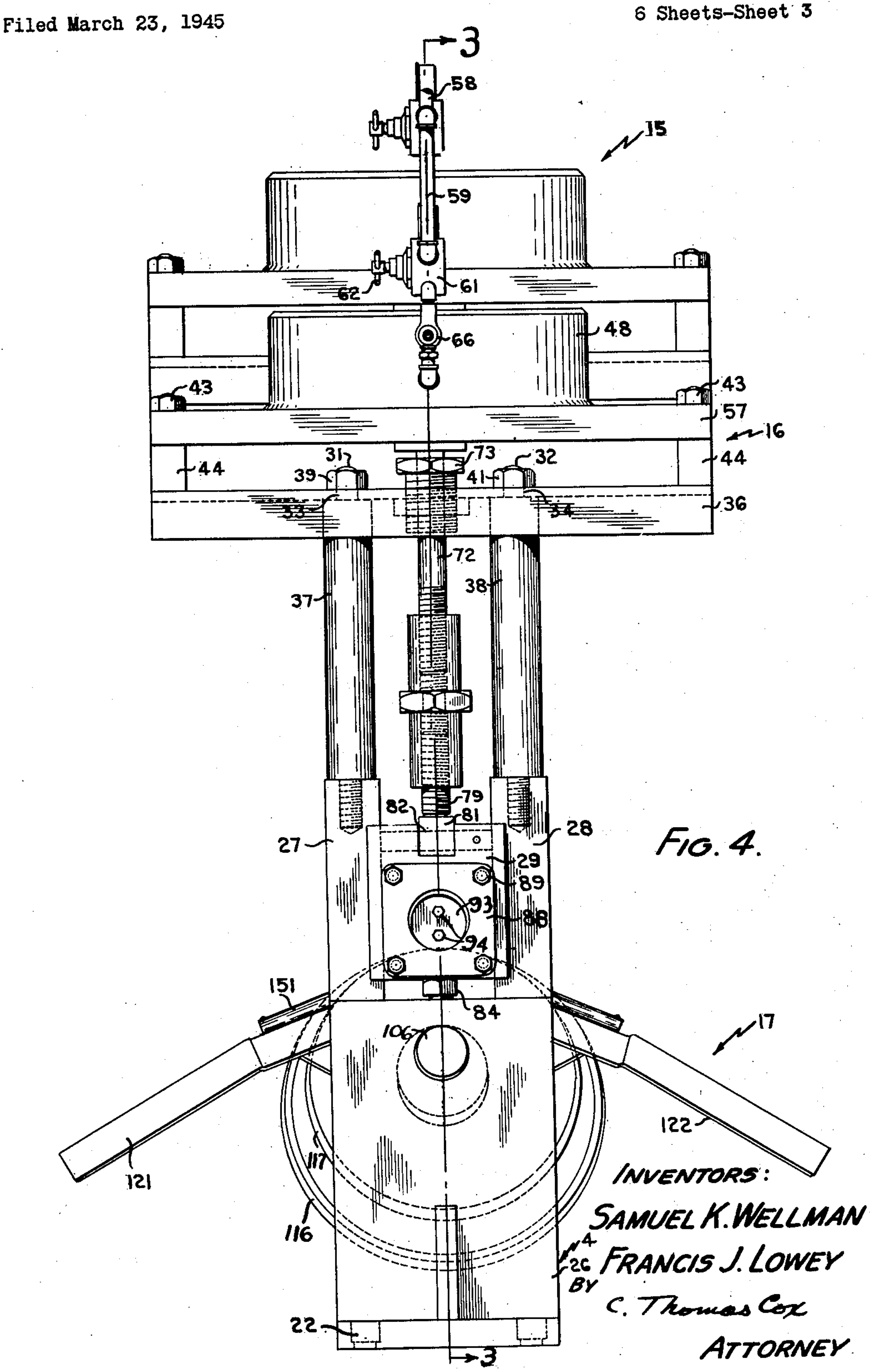
Fig. 4 is an end elevation of the upper portion of the apparatus of Fig. 1, but on an enlarged scale.
Figure 6:
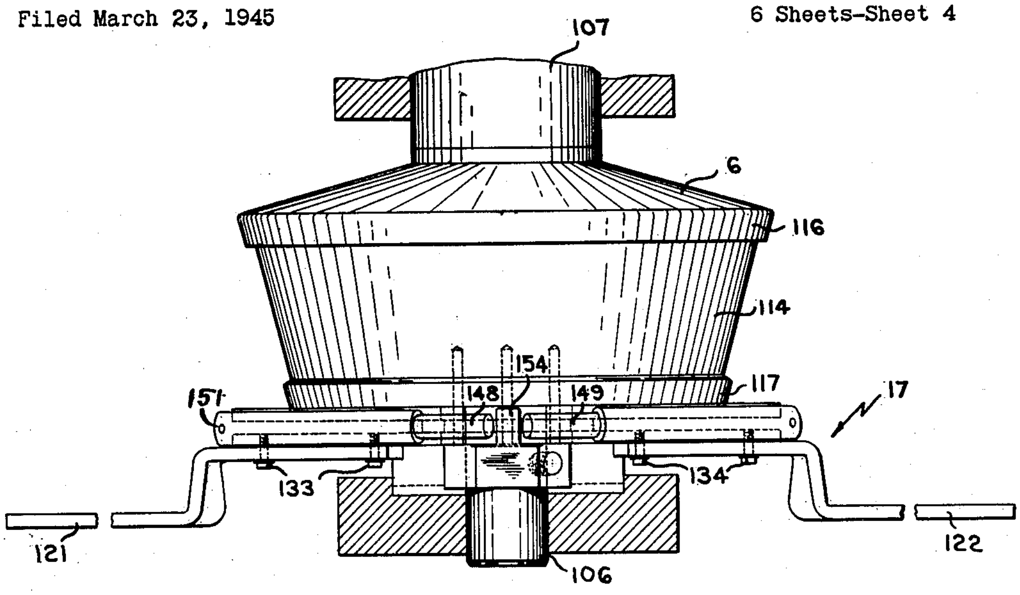
Fig. 6 is a horizontal section on line 6—6 of Fig. 5.

Now that the major components have been identified, the apparatus will be specifically described. Referring to Figs. 3 and 4, it will be seen that the frame 4 of the roll bending unit comprises a base plate 22 adapted to be bolted at 23 to the base 1, shown in Fig. 1, which rests on a suitable foundation, such as a concrete floor. Extending upwardly from the base 22 and welded thereto are the spaced side plates 24 and 26. As seen in Fig. 4, the upper portion of the plate 26 is bifurcated and has the upstanding parallel portions 27 and 28 which cooperate to define a vertical slideway or guide for reception of the bearing block 29 of the roll 7.

The foot switches 19 and 21 are secured to the lower portion of the base 1, see Fig. 2, and each switch has a pivoted foot pedal 20, 25 which is spring pulled upwardly.

The pressure applying unit 16 is positioned above the side plate 26 and is held in spaced relation thereto by means of a bolt 31, see Fig. 4, which is threaded into the upper end of the portion 27 and a bolt 32 threaded into the upper end of the portion 28. These bolts extend through openings 33, 34 in a channel member 36 of the pressure unit 16. Long sleeves 37, 38 surround the bolts and serve to space the channel member 36 above the portions 27, 28, and nuts 39, 41 on the upper ends of the bolts 31, 23 serve to secure the channel member 36 in position.

The channel member 36 serves as a supporting frame to carry the backing plate 42 of the pressure applying unit, see Fig. 3. This backing plate 42 is bolted at 43 to the ends of the channel member 36, see Fig. 4, and held in spaced relation thereto by means of the blocks 44. The backing plate 42 is of generally circular configuration and has disposed on the underside thereof a thin sheet metal diaphragm 46, see Fig. 3, which is welded thereto at its peripheral margin 47.

An accumulator or pressure supplying tank 48 is mounted on the upper side of the backing plate 42 and comprises an upstanding cylindrical wall 49 welded to the upper side of the plate 42 at 51 and a circular top plate 52 welded at its circumference 53 to the upper edge of the cylindrical wall 49. The cylindrical wall 49, the top plate 52, and the backing plate 42 cooperate to define a chamber 54.

An opening 56 through the center of the backing plate 42 provides communication between the chamber 54 and the diaphragm 46. It is thus seen that if gas under pressure is admitted to the chamber 54, the diaphragm 46 will also be under pressure and will be expanded downwardly to a slight extent.

A downwardly extending shield 57 is secured to the margin of the backing plate 42 to serve as a guard in case of rupture of the diaphragm 46.

The chamber 54 is connected to a source 58 of gas, such as air, under pressure by means of the pipe 59 and pressure regulating valve 61. The pressure regulating valve 61 is provided with an adjusting handle 62, a pressure gauge 63 to indicate the line pressure of the gas from the source and a pressure gauge 64 to indicate the reduced pressure of the air in the chamber 54. This pressure regulating valve 61 is of the usual construction for maintaining a constant reduced pressure in a chamber such as that at 54 regardless of variations in the pressure from the source 58. The valve permits adjustment of the pressure in chamber 54 by turning handle 62. A pressure relief valve 66 having an adjustment nut 67 and an exhaust opening 68 connects at 69 with the chamber 54 to protect the diaphragm 46 in case of failure of the pressure regulator 61 or improper adjustment thereof by an inexperienced operator.

A circular pressure plate 71 is disposed immediately below the diaphragm 46 and has a downwardly extending shaft 72 slidably received in a bushing 73 which is threaded into an opening 74 in the channel member 36 and into a threaded nut 75 welded to channel member 36 in line with the opening 74. The lower end of the shaft 72 has a right hand thread 76 which is received by the long adjusting nut 77. The lower end of the adjusting nut 77 has a left hand thread 78 for threadably receiving the downwardly extending bolt 79 which has a square head 81 received in an opening 82 in the upper end of the bearing block 29 and secured thereto by means of a pin 83. It will be seen that the admission of air or other gas under pressure to the chamber 54 will cause the diaphragm 46 to bulge downwardly and apply pressure to the pressure plate 71 which will communicate this pressure through the rod 72 to the bearing block 29 which rotatably mounts one end of the drive roll 7.

The long nut 77 may be turned to adjust the vertical position of the roll 7 and pressure plate 71 to accommodate different thicknesses of work.

A bolt 84 has its head disposed under the center of the bearing block 29 and is threaded into the side plate 26. The head of the bolt serves as a stop to limit downward movement of the bearing block 29. The threaded bushing 73 serves as an adjustable stop to prevent excessive downward movement of the diaphragm 46.

The drive roll 7 is of tapered or conical shape in its central or rolling portion as is evident from Fig. 3. This shape is selected so that there is no relative sliding movement between the surface of the roll and the surface of a flat arcuate blank (Figs. 10 and 11) fed between the two rolls. The tapered or conical shape eliminates surface scuffing and insures true rolling contact.

The bearing block 29 of the drive roll 7 is provided with a central opening 86 for reception of the ball bearing 87. The outer race 96 of the ball bearings 87 is held against a shoulder 97 of the bearing block 29 by means of the retainer plate 88 and bolts 89. The inner race 91 of the ball bearing 87 is held against the shoulder 92 of the drive roll 7 by means of the retainer plate 93 which is bolted at 94 to the end of the drive roll 7. The outer race 96 of the bearing 87 has an arcuate cross section to permit a limited amount of tilting movement of the drive roll 7 and a small variation in the angle of inclination of the axis of the drive roll 7 with respect to the axis of the conical roll 6. A packing ring 90 encircles the roll 7 adjacent the bearing 87 to keep oil from the driving surface of the roll.

The pressure applying unit 15 and the frame side plate 24 of the left hand side of the roll bending unit of Fig. 3 are constructed in a similar manner to those of the right side which has been described in detail. An inspection of the drawings shows that this left side has a pressure chamber 98, a pressure regulating valve 99, and a diaphragm 101 for applying pressure to the pressure plate 102 which in turn applies pressure to the bearing block 103 of the left side of the drive roll 7, through the shaft 104, adjusting nut 100 and bolt 105. A stop bolt 110 is also provided under the bearing block 30. The pressure unit 15, as shown in Fig. 3, is disposed above the pressure unit 16 thus requiring a longer shaft 104, but otherwise the construction is the same and will not be further described.

The conical roll 6 is rotatably carried on a stationary axle 106 which has an enlarged head 107 received in an inclined opening 108 in the side plate 24. A pin 109 extends through the side plate 24 and the head 107 to hold the axle against movement. A thrust bearing 111 is disposed between the head 107 and the end of the conical roll 6, while sleeve bearings 112 are disposed between the roll 6 and the shaft 106. As shown in Fig. 3, the axle 106 is disposed at an angle to roll 7 and the upper end thereof is received in an inclined opening 113 in the side plate 26.

The conical roll 6 is generally of truncated cone shape and is provided with a channel 114 defined by the shoulders 116, 117 for reception of the work.

The conical roll 6 is provided with a starting device generally indicated at 17 for imparting an initial rotation to the conical roll, see Figs. 2 and 4. This starting device operates on the pawl and ratchet or over-running clutch principle and is provided with handles 121 and 122, extending outwardly from the machine. An operator standing in front of the machine and raising the handle 121 to a limited extent will rotate the conical roll 6 so that the top moves away from the operator. Similarly, an operator standing on the other side of the machine can rotate the conical roll in the opposite direction by raising the handle 122. This raising of the handles and partial rotation of the conical roll 6 is necessary to initially feed a bimetallic blank between the pressure or drive roll 7 and the conical roll 6. Once the blank has been started between the two rolls the continued rotation of the drive roll 7 by the motor drive unit 3 will serve to feed the blank between the rolls and rotate the lower conical roll 6.

The starting device 17 is best illustrated in Figs. 5 through 8. It comprises a flanged feed collar 123 rotatably encircling the stationary axle 106 of the conical roll and secured to the conical roll 6 by means of the three spaced pins 124, see Fig. 5. The feed collar 123 has a raised peripheral flange or rim 125 which is adapted to be engaged by the pawls 127 and 128 of the starting device to rotate the conical roll.

Figure 5:
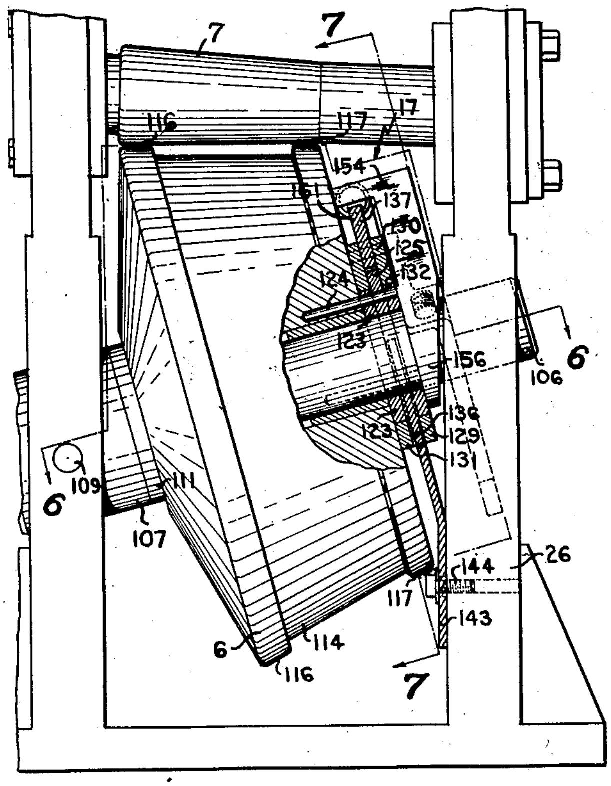
Fig. 5 is an enlarged front view of the lower portion of the roll stand of Fig. 1, parts being in section.

Spaced handle carrying plates 129 and 131 have circular openings 132 at the center thereof for reception of the collar 123, the flange 125 of the collar 123 being located between the plates 129 and 131 as shown in Figs. 3 and 5.

The handles 121 and 122 extend outwardly from the plate 129 and are secured thereto by means of bolts 133 and 134. It will thus be seen that the raising of the handle 121 will cause the plates 129 and 131 to rotate on the collar 123. The plates 129 and 131 are held in spaced relation by means of the lower spacing member 136 and the upper spacing member 137, see Fig. 5. The plates and the lower spacing member 136 are welded together while the upper spacing member 137 is secured to the plates 129 and 131 by means of the pins 130.

Figure 7:
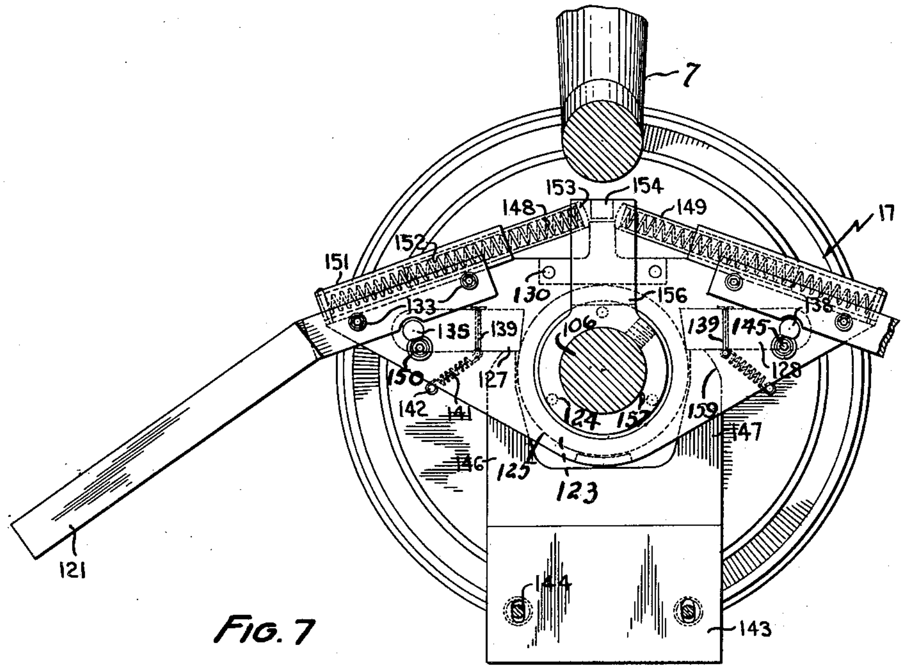
Fig. 7 is a vertical section on line 7—7 of Fig. 5 with the roll starting device in neutral position.
Figure 8:
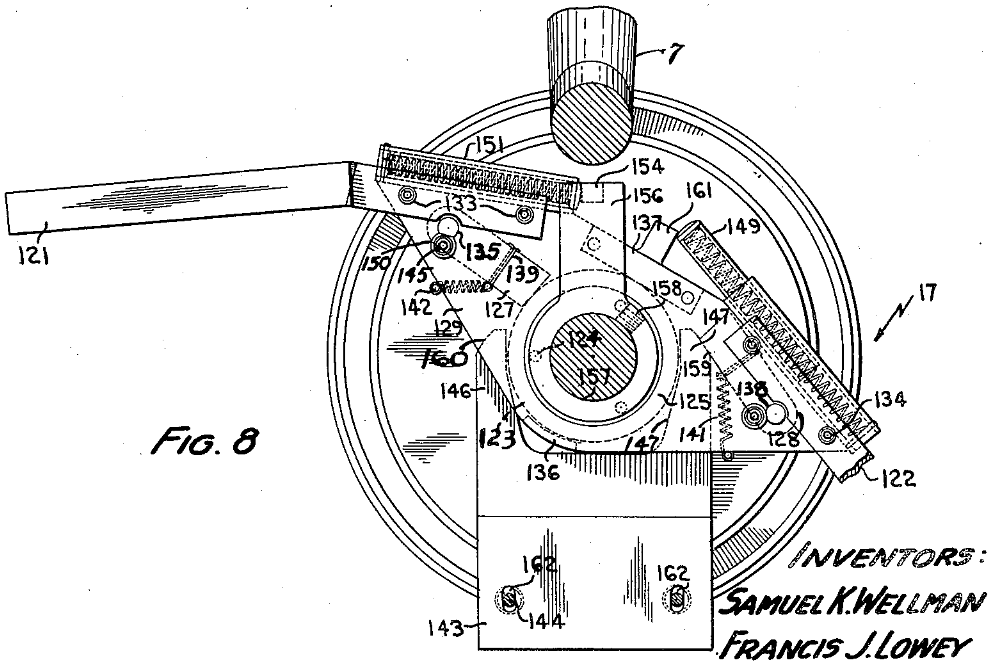
Fig. 8 is a view similar to Fig. 7, but with the roll starting device in elevated or feeding position.

The pawl 127 is disposed between the plates 129 and 131 and is pivoted thereto at 135, see Figs. 7 and 8. Similarly the pawl 128 is disposed between the plates on the other side of the axle 106 and pivoted by means of the pin 138. The pivot pins 135 and 138 are held in place by means of cap screws 145 and washers 150. Each pawl is provided at its inner or free end with a cotter pin 139 extending through a hole in the pawl and having its head disposed on the lower side of the pawl. A spring 141 connects each cotter pin with a pin 142 extending through the loop of the spring and spanning the plates 129 and 131. The springs serve to resiliently pull the pawls downwardly.

A vertical plate 143, see Figs. 5, 7 and 8, is secured by the bolts 144 to the side plate 26 of the main frame of the roll bender unit and is provided with upwardly extending spaced fingers 146 and 147 which extend upwardly between the plates 129 and 131 on opposite sides of the collar 123. The upper ends of these fingers serve as stops to prevent downward rotation of the pawls 127 and 128 when the starting device is in the position shown in Fig. 7 and have inclined cam surfaces 159, 160 for a purpose later described.

In the neutral position shown in Fig. 7, the length of the pawls 127 and 128 is such that their inner ends are not in contact with the flange 125 of the collar 123 and the conical roll 6 is free to rotate. The starting device is held in this neutral position by means of spring plungers 148 and 149. The plunger 148 is slidably received in the cylinder 151 which is welded to the upper edges of the plates 129 and 131. A spring 152 is disposed in the cylinder 151 to urge the plunger 148 out of the cylinder. The exposed end 153 of the plunger 148 engages a fixed stop 154 carried by a plate 156 which has an opening 157 for reception of the axle 106, see Fig. 8. A set screw 158 serves to secure the member 156 to the axle 106 and thus hold the stop 154 against rotation.

The plunger 149 is constructed in the same manner as the plunger 148 and it will be evident that these two plungers serve to maintain the starting device 17 normally in its central position as shown in Fig. 7. If the starting device is operated by lifting one handle to the position shown in Fig. 8 the spring 152 will be compressed and the starting device will be pushed back to neutral position on release of the handle.

The rotation of the starting device by lifting the handle 121 from the position shown in Fig. 7 raises the pawl 127 from the stop finger 146 and permits it to rotate in a clockwise direction and engage the feed collar 123. Continued elevation of the handle to the position shown in Fig. 8 will rotate the feed collar 123 and the conical roll 6. During this rotation the opposite pawl 128 rides over the inclined cam surface 159 of the stop finger 147 and is kept out of engagement with the flange 125 of the feed collar 123. On release of the handle 121 the spring 152 will return the starting device to its initial position, the pawl 127 freely riding over the flange 125 during this return movement. During this return the inclined cam surface 159 serves to keep the pawl 128 out of engagement with the feed collar 123.

The upper spacing member 137 which serves to space apart the plates 129 and 131 is provided with an upwardly extending stop 161 normally disposed between the ends of the plungers 148 and 149. Rotation of the starting device 17 and the stop to the position shown in Figure 8 causes this stop member 161 to hold the plunger 149 in inactive position and out of contact with the fixed stop 154. It will be observed that these two stops 161, 154 cooperate in the normal position of Fig. 7 to form one stop.

The starting device may be operated to impart an initial rotation to the conical roll 6 in a reverse direction to that described above by lifting handle 122 whereupon pawl 128 will engage the flange 125 of the feed collar 123 to rotate the conical roll 6 and pawl 127 will be rendered inactive by the cam surface 160.

It will thus be seen that the starting member 17 is in essence a reversible over-running clutch which will enable an operator to impart an initial rotation in either direction to the conical roll 6 while permitting faster rotation of the conical roll after the work has been inserted between the two rolls.

It will be noted that the pawl stop member 143 having the upstanding fingers 146 and 147 which serve as stops for the pawls has elongated holes 162 for reception of the bolts 144, see Fig. 8. This permits vertical adjustment of the member 143 to vary the normal position of the pawls to insure clearance of the pawls from the flange 125 when the starting device is in normal position.

While we have described the starting device as applicable here to the conical roll 6 and the roll 7 as being power driven, it is apparent that this relation may be reversed if desired. Also the starting device illustrated is useful with other rolls such as cylindrical rolls and it is obvious that there are other modifications of starting devices which may be used to impart an initial rotation to the conical roll 6.

Figure 9:
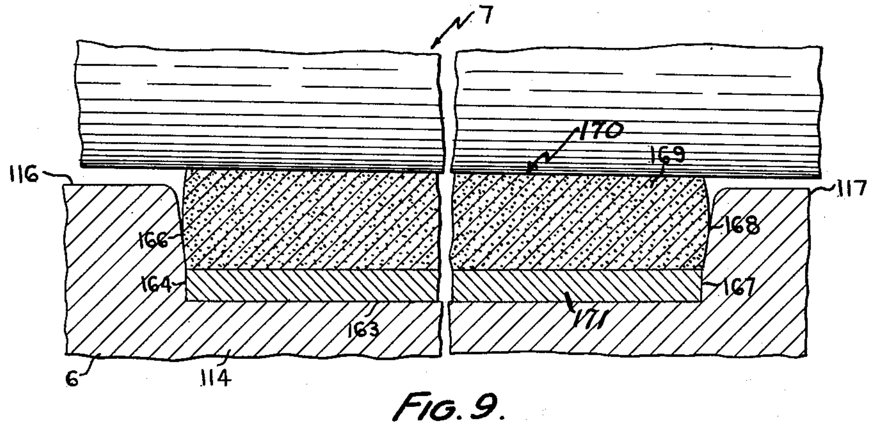
Fig. 9 is a diagrammatical showing on a greatly enlarged scale of a section of a bimetallic article in position between the rolls of the apparatus, the section being taken in a direction parallel to the axes of the rolls.

As indicated above the conical roll 6 is provided with a channel 114 defined by the shoulders 116 and 117. The construction of this channel is of considerable importance and is shown in Fig. 9 on an enlarged scale. The channel 114 has a flat bottom 163. The shoulder 116 has a minor side wall portion 164 extending upwardly at right angles to the bottom 163 and then a major inclined side wall portion 166 which is disposed at a slight angle to the right angle wall portion 164. The shoulder 117 is similarly constructed with an upstanding right angle side wall portion 167 and an inclined side wall portion 168.

Fig. 9 also shows a bimetallic blank 170 in position between the conical roll 6 and the drive roll 7. It will be observed that the steel backing member 171 of the blank snugly fits in the portion of the channel defined by the bottom 163 and the right angle side wall portions 164 and 167. The sintered powdered metal portion 169 of the bimetallic blank normally has straight sides but the roll bending operation has compressed the porous sintered material and caused the sides to bulge outwardly as shown in this figure. The inclination of the side wall portions 166 and 168 is to provide a space into which the sintered metal can expand. Unless this relief space is provided the sintered facing will be badly chipped and cracked at the sides by the rolling operation.

The inclined side wall portions 166 and 168 serve another function in keeping the blank in the channel. If the blank attempts to rise upwardly and ride out of the channel the inclined walls will guide it back into position. The angle of inclination of the inclined portions 166 and 168 appears to be rather critical. If the angle is too great the blank will be apt to ride out of the channel. If the angle is too small there will be insufficient space for the bulging of the sides of the sintered material. Furthermore, if the angle is too small, the blank will not be guided into place and if it becomes misaligned, it will remain out of line and the steel backing will be curled or bent and the facing cracked. We have found that the angle of inclination between the major side wall portion and the plane of the minor side wall portion should be from 4 to 15°. For a conical roll having a channel 114 about 3¼″ wide and diameters of 10″ and 11¼″ at the sides of the channel, an angle of inclination of about 7° between the inclined wall portions 166, 168 and the planes of the right angle wall portions 164 and 167 of the channel 114 appears to function best.

A channel of the configuration shown in Fig. 9 may also be used with cylindrical rolls and jigs to form bimetallic blanks to cylindrical shape and is very useful in preventing twisting and misalignment of the blank during the rolling operation. The importance of preventing misalignment of the blank during the rolling operation is readily apparent. In the case of a conical roll such as shown in Fig. 5, the shape of the final blank depends on its lateral position on the conical roll during the rolling operation. If the conical roll 6 had no channel it would be difficult to insure that the blank passed between the rolls at that particular circumference of the conical roll which would insure that it be bent to the desired configuration. Furthermore, if the blank enters the rolls at an angle to the axes it will be bent or twisted to an irregular shape. These problems are also present with cylindrical rolls and jigs for if the blank enters at an angle, it will be formed to a distorted shape resembling a portion of a corkscrew. Thus a channel is of great value in insuring that the article to be bent will achieve the desired final shape. The cross-sectional shape of the channel is important in insuring that it achieve these functions.

It is of course apparent that the right angle side wall portions 164 and 167 of the channel 114 are necessary to retain the blank in place and prevent riding out of the channel. If the inclined portions 166 and 168 extended to the bottom 163 of the channel, it would be more difficult to maintain the blank in position.

Figures 10, 11, 12, 13, 14:
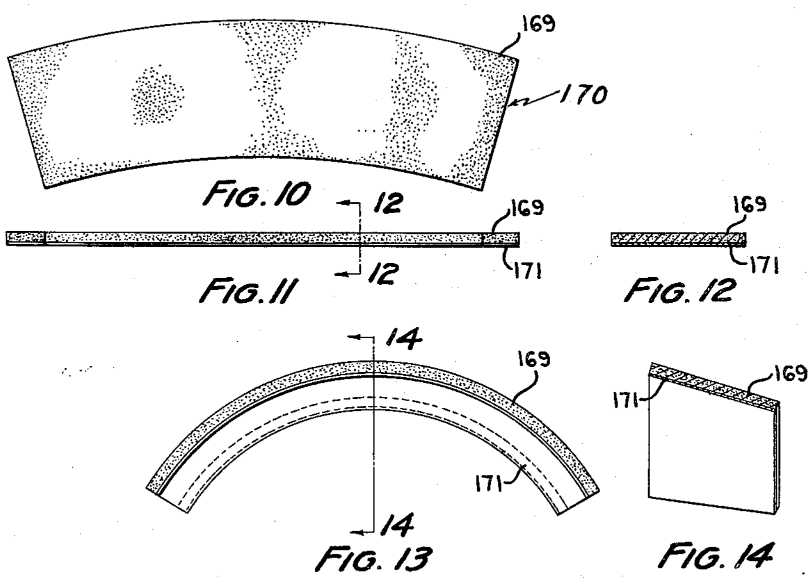
Fig. 10 is a plan view of a flat arcuate bimetallic blank suitable for bending to conical shape.
Fig. 11 is a side elevation of the blank of Fig. 10.
Fig. 12 is a vertical section of the blank on line 12—12 of Fig. 11.
Fig. 13 is a side elevation of the blank of Fig. 10 after it has been bent according to the teachings of our invention.
Fig. 14 is a vertical section on line 14—14 of Fig. 13.

The theory and method of operation on the roll bending apparatus can best be understood by references to Figs. 10 to 15. A blank 170 suitable for forming to curved shape is illustrated in Figs. 10 to 12 and is shown as comprising a sintered powdered metal facing 169 integrally bonded to a solid metal backing member 171. As shown in Fig. 10 this blank is of generally flat, arcuate formation. After being processed in accordance with our invention this blank will assume the shape shown in Figs. 13 and 14 as a generally conical member having the sintered facing 169 disposed on the exterior or convex side of the solid metal backing member.

The blank of Fig. 10 may be produced in any manner, but we prefer to produce it as follows.

The powdered metal facing is produced by intimately mixing metallic and non-metallic powders to form a predominately metallic mixture of desired composition. If the article is to be used for clutch or brake purposes, we have found that the following mixture is suitable:

*Mixture A*

| | Per cent by weight |
|---|---|
| Cu | 67.26 |
| Sn | 5.31 |
| Pb | 8.72 |
| Fe | 7.21 |
| C | 7.08 |
| $SiO_2$ | 4.42 |

If the article is to be used as an anti-friction material, as for a bearing, the following composition is suitable:

*Mixture B*

| | Per cent by weight |
|---|---|
| Cu | 70.90 |
| Sn | 6.36 |
| Pb | 13.64 |
| C | 9.10 |

After the powders are mixed they are then placed in a die and pressed under sufficient pressure to form a briquette. Usually a pressure of about eleven tons per square inch will be sufficient. This briquette is then placed on the clean and properly prepared surface of a suitable solid metal backing member, which for example may be of steel for strength or of copper for heat conductivity. The assembled unit of facing and backing are pressed together under a pressure of from 100 to 250 pounds per square inch while being heated to a sufficient temperature and for a sufficient length of time under non-oxidizing conditions to sinter the powdered facing and bond it to the backing member.

In the case of composition A, a temperature of 1425 to 1510° F. is adequate to sinter the mixture and bond it to a steel backing member. For mixture B, a lower temperature of around 1300° F. should be used.

The blank may be made to the exact shape shown in Fig. 10 by using molds and dies of proper shape or it may be cut to shape from a larger blank.

In order to achieve a strong union between the sintered facing and the solid metal backing member, the surface of the backing member must be properly prepared before the heating operation. Numerous methods for accomplishing this are set forth in Wellman Patent No. 2,178,527, issued October 31, 1939, but we prefer to use the method involving the chemical cleaning of the surface followed by the application thereto of a very thin electroplating of a suitable metal such as copper or nickel. This plating is exceedingly thin, having a thickness of about .0002 inch, and disappears during the heating step. It functions as a protective medium to prevent oxidizing of the backing member during the heating step by the moisture and air absorbed or adsorbed by the powders.

As has been set forth in the co-pending applications referred to above, bimetallic articles of this type may be satisfactorily formed to a conical shape by progressively mechanically working in a differential manner the more plastic layer which in this case is the sintered metal facing. This is achieved by graduating across the width of the blank the degrees of progressive mechanical working. For example, cylindrical rolls can be used to form the flat, arcuate blank of Fig. 10 to conical shape by adjusting the rolls so that their axes and their surfaces are disposed at a slight angle in order to work one edge of the facing more severely than the other. This greater severity of working results in greater elongation of that portion of the facing and a consequent degree of bending. The cylindrical rolls may be rigidly held in a predetermined tapered spacing.

The co-pending applications set forth a variation on this process in which the differential working is achieved by varying the pressure applied by the rolls across the face of the blank. The use of cylindrical rolls is objectionable however, in that it renders it difficult to readily produce conical articles even though a bending jig or form is utilized. The apparatus of the present invention is designed to differentially work in a progressive manner successive lateral areas of such facings and to utilize a conical roll which also functions as a jig.

In the apparatus shown, the differential working is preferably accomplished by applying greater resilient pressure to one side of the drive roll 7 than to the other side. Thus the pressure applying unit 16 is adjusted so that it will apply a greater pressure to the bearing block 29 of the drive roll 7 than is applied by the pressure unit 15 to the other bearing block 103. As a result of this, the degree of mechanical working of the blank will be graduated across the blank.

Thus it will be observed by reference to Fig. 9 that the overall thickness of the facing 169 and backing 171 of the bimetallic blank 170 is less at the right side of the figure than at the left side. Similarly the space between the surface of the drive roll 7 and the bottom 163 of the channel 114 gradually decreases from the left to the right in that figure. This is a result of the greater pressure on the right hand side of the roll and the more severe working and elongation of that portion of the blank. This greater working and elongation will cause a greater bending of that portion of the blank resulting in the bending of the blank to the conical shape shown in Figs. 13 and 14.

Fig. 9 shows this differential working on a greatly exaggerated scale. In practice this variation will amount to only a few thousandths of an inch, as will be evident from the example given below.

Figure 15:
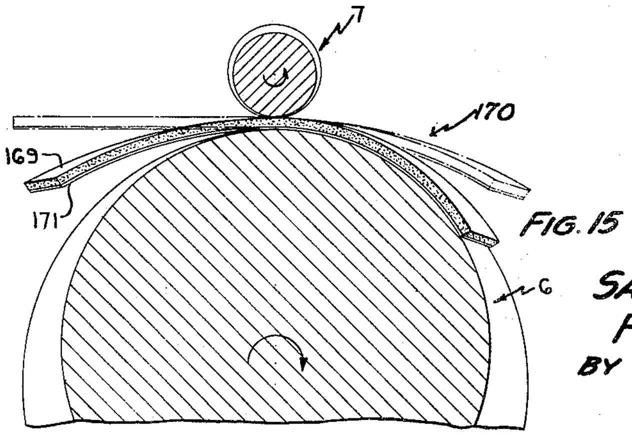
Fig. 15 is a diagrammatical vertical section through the rolls of the apparatus and showing the work in process of being bent, the section being taken in a direction at right angles to the axes of the rolls.

This feature and the general operation of the apparatus is evident from Fig. 15 which diagrammatically illustrates the method of operating the apparatus. This figure shows in section the upper drive roll 7 and the lower conical roll 6 with a bimetallic blank 170 disposed in position therebetween. The rolls are rotated in the direction of the arrows shown and the blank passes between them from the left to the right of that figure. The blank is shown in its dotted line position midway during its first passage between the rolls and it will be observed that the right hand portion of the blank has been partially bent. On the second and succeeding passage between the rolls, the blank is shown in solid lines in its midway position and as having been bent on its right hand portion to the contour of the roll.

It will be seen that the working of the sintered facing of the blank and the consequent differential elongation of the same has caused the blank to be differentially bent until it attains the conical contour of the channel of the conical roll 6. The conical roll 6 therefore serves as a template or jig to accurately predetermine the finished shape of the blank.

As set forth above, the differential bending of the blank to conical shaping is preferably accomplished by applying a different amount of pressure to the pressure applying unit 15 than to the pressure applying unit 16. These pressures are produced by gas under pressure acting on diaphragms and is a yieldable pressure due to the compressibility of the pressure medium.

As stated above, the pressures applied to the blank must be suitably chosen to achieve the desired bending. If the pressures are too great the sintered facing will be expanded to too great a degree and the blank will be over bent. If the pressures are too low, too many passes between the rolls will be required for proper bending. Similarly, the variation in pressure between the chamber 98 and the chamber 54 must be maintained to achieve the required differential bending. With the apparatus illustrated these features are not too critical and satisfactory bending is readily achieved.

The use of gas pressure to force the drive roll toward the conical roll is highly advantageous in that it greatly reduces variations in results due to variations in thickness and plasticity of the layers of the blank. Since the degree of bending depends on the extent of the mechanical working of the more plastic layer of the blank, it is essential that the amount of mechanical working be uniform lengthwise of the blank. If the pressure rolls are rigidly held in spaced relation it is apparent that variations in thickness and plasticity of the layers of the blank will result in variations in the amount of mechanical working and the degree of bending obtained. The use of gas pressure as disclosed here serves to greatly reduce variations in bending due to variations in the blank. With gas pressure, succeeding lateral areas of the blank receive the same amount of pressure from the rolls and are worked substantially to the same extent regardless of thickness.

If gas or some other compressible fluid is utilized to supply the pressure to the rolls there will be obtained a resilient pressure on the rolls. The chambers or accumulator tanks 54 and 98 are provided to increase the volume of gas which is applied to the diaphragms 47 and 101. The large volumes of these chambers are necessary in order to maintain the pressure on the diaphragms substantially constant, regardless of slight upward movements of the diaphragms due to variations in thickness of the blank being bent. Obviously springs could be substituted for the gas pressure diaphragms but we have found that the disclosed apparatus functions very satisfactorily and is easy to control.

The apparatus of the present invention is also adapted to bend a flat, arcuate blank to conical shape without the use of the yieldable pressure produced by the pressure applying units 15 and 16. Due to the provision of adjustment nuts 77 and 100 and the stop bolts 84 and 110, it is apparent that the drive roll 7 may be adjusted so that it may be rigidly held at any predetermined position. If the stop bolts 84 and 110 are adjusted to elevate the drive roll 7 to desired position, then the roll may be rigidly clamped in this position by turning the long adjusting nuts 77 and 100 to elevate the pressure plates 71 and 102 into contact with the backing plates 42 and 101. In this condition of the machine it will progressively mechanically work in a differential manner successive lateral areas of a bimetallic blank. However, uniform bending of a blank and consistency in results require that the blank be of uniform thickness and plasticity. For these reasons we prefer to use the yieldable pressure provided by the pressure applying units 15 and 16.

From the above description of the apparatus and the theory of operation, the method of operating the machine and of forming the bimetallic blank to the predetermined conical shape should be apparent but will be set forth here for clarity. The machine is best operated by two persons who will stand on opposite sides of the machine or on the right and left hand side as shown in Fig. 2, so that each operator has available a handle 121, 122 of the starting device 17, a foot switch 19, 21 and access to the main switch 18 located on the motor. The drive roll 7 will be adjusted by the operators to proper position by turning the long nuts 77 to raise or lower the roll. They will also adjust the stop nut 73 and stop bolts 84 to limit the movement of the roll. Then they will admit air to the pressure chambers 54 and 98 by adjusting the pressure regulating valves 61 and 99 to attain the desired pressure on the diaphragms 46 and 101.

The operator on one side of the machine will then step on the pedal of the foot switch 19 or 21 to rotate the drive roll 7 in a direction so that the top of the roll moves toward him. He will then place a flat, arcuate bimetallic blank in position to feed between the two rolls. The end of the blank will be pushed between the rolls with the solid metal backing member disposed adjacent the conical roll 6 and with the arcuate side of shorter radius disposed toward the small ends of the conical rolling surfaces of the roll. To facilitate entry of the blank between the rolls, he will raise the handle of the starting device to impart a partial rotation to the conical roll. Once the blank starts between the rolls it will be rapidly fed forward by the drive roll 7, and the starting device will be inactive and the handle may be released. The blank will be fed between the rolls and will emerge on the other side in a partially bent condition as shown in the dotted line indication in Fig. 15. It will be caught by the operator on the other side of the machine who will hand it back to the first operator for second passage between the rolls.

The stop bolts 84 and 110 serve to limit the extent of downward movement of the bearing blocks 29 and 30 of the drive roll 7. These stops are necessary to insure that a bimetallic blank may be readily fed into the machine. They will be adjusted so that when the bearing blocks 29 and 30 rest upon the stop bolts 84 and 110 the distance between the bottom of the channel 114 and the circumference of the drive roll 7 is a few thousandths less than the final thickness of the finished blank. For example with a blank having an overall thickness of .250 inch and which will be reduced during the rolling operation to a thickness of .240 inch, the stop bolts 84 and 110 will be adjusted so that the spacing between the rolls is approximately .238. This spacing is sufficient so that an operator using the starting device 17 can force a blank between the rolls and raise the drive roll 7 upwardly against the pressure exerted by the pressure units 15 and 16.

In some cases it may be possible to dispense with the starting device 17. For example the entering end of the blank to be bent may have a taper produced thereon as by grinding to permit starting of the blank. It is also obvious that a power drive could be provided for the conical roll 6 and that this would eliminate the need for the starting device 17. However, the apparatus shown has functioned very satisfactorily without resort to either of these expedients.

The configurations of the drive roll 7 and the conical roll 6 are such that there is true rolling contact between the rolling surfaces of the rolls and the surfaces of the blank. There is theoretically no sliding movement between the surfaces of these rolls and the surface of the blank to be bent. This elimination of sliding and scuffing of the facing of the blank appears to give a better product. However, the drive roll 7 could be of cylindrical shape if such scuffing is not objectionable.

The thickness of the blank and the relative plasticity of the layers together with the diameter of the conical roll 6 determine the required pressures for the pressure chambers 54 and 98. In addition the pressure required is affected by the number of passes between the rolls which are utilized to bend the blank to final shape. Although the blank may be bent to final shape in one passage, it is preferred to use several passages to eliminate danger of cracking or chipping and over bending.

One specific example is as follows. A bimetallic blank having a S. A. E. 1010 H. R. steel backing $\frac{1}{16}$'' thick and a sintered facing of composition A above and a thickness of $\frac{3}{16}$ of an inch, a width of 3¼'' and an arcuate length of about 12'' is to be bent to a conical shape having a large radius of 5⅞'' and a small radius of 5''. For this, the pressure applied to chamber 98 will be about 40 pounds per square inch and the pressure applied to chamber 54 will be about 45 pounds per square inch, for diaphragms having a diameter of about 18'' and a drive roll 7 having an average diameter of about 2½''. The rolling operation will reduce the thickness of the blank from .006 to .010'' with one edge being about .002 to .003'' thinner than the other. This variation in thickness across the blank is so slight as to be negligible. It of course can be eliminated by starting with a flat blank that is initially .002 to .003'' thicker on the edge which will be given the greatest reduction in thickness.

The foot switches 19 and 21 are operated by the feet of the operators and are of the reversing type. When the pedal is in elevated position, the switch energizes the motor 11 to rotate the drive roll 7 so that the top thereof moves away from the operator. When in lowered position, the roll direction of rotation is reversed. The hand switch 18 serves to selectively energize the switches 19 and 21. The switches act as a safety feature to allow the operator to quickly reverse the roll by raising his foot from the switch pedal.

In actual operation, the operator on one side of the machine will turn the hand switch 18 to energize his foot switch and will feed a large number of blanks through the rolls in succession. These will be caught and placed in a pile by the other operator. Following this, the second operator will assume control over the machine, turn the hand switch 18 to energize his foot switch only and will feed the partially formed blanks back through the rolls to the first operator. This sequence has been found desirable in that it reverses the direction of rolling for successive passes of the same blank, an expedient that apparently achieves better results.

While we have used the term conical to describe the roll 6 and the configuration of the finished blank of Figs. 13 and 14, it is apparent that neither of these are true cones but are really segments or frustums of cones. However, the term conical is intended to cover these modifications as well as true and complete cones.

While the invention has been described with reference to a bimetallic blank having a sintered metal facing, it is applicable to any bimetallic article having layers of different plasticity. The term plasticity is used to denote those flowable properties of a material which permit its being progressively mechanically worked and elongated by passage between a pair of opposed pressure rolls. The progressive mechanical working of such a bimetallic article causes the more plastic layer to be elongated and results in bending of the blank. In some instances the sintered facing may be the least plastic layer, as where a sintered iron facing is secured to a backing member of soft sheet copper. Passage of such a blank between pressure rolls would result in reverse bending with the sintered facing disposed on the inner or concave side of the backing.

Any bimetallic article having layers of different plasticity may be progressively mechanically worked according to our invention. Thus a blank having solid copper secured to solid steel could be bent by the apparatus of our invention. However, the bending of such solid metal blanks by using presses or other apparatus presents no great problem and our invention finds its greatest use in the controlled bending to a predetermined shape of bimetallic articles having a sintered powdered metal facing.

The terms "plastic" and "plasticity" are used to indicate the flowable or deformable properties of the sintered material which permit the elongation and cause the bending. While sintered metallic material is generally of low tensile strength in comparison with solid metal, such as steel, it does possess the property of being plastic or flowable to a rather high degree. In this respect, it may be said that it is of high ductility in that it is capable of being deformed and hammered out.

The above description and examples are regarded as illustrative only and have been set forth at length to more clearly describe the invention. It is contemplated that there are numerous modifications and changes which may be made without departing from the spirit of the invention and scope of the appended claims.

We claim:

1. Apparatus for the controlled bending of a flat, arcuate, bimetallic blank to conical shape comprising a supporting frame; a pair of opposed pressure rolls rotatably mounted in said frame with their axes in the same plane and inclined to one another, one of said rolls having a conical rolling surface of a contour the same as that desired for the finished blank; at least one of said rolls being mounted for movement toward and away from the other; means for resiliently urging said movably mounted roll toward said other roll under controlled pressure; power-driven means for rotating one of said rolls; and hand-operated means including an over-running clutch for imparting an initial rotation to the other roll.

2. The apparatus of claim 1 in which the over-running clutch is reversible operating whereby the roll may be given an initial rotation in either direction.

3. The apparatus of claim 1 in which the hand operated means includes a feed collar carried by the roll; a pivoted plate carrying pivoted pawls, said pawls being disposed on opposite sides of said collar and adapted to have their free ends engage said collar; spring means urging said pawls to rotate into engagement with said collar; and cam means having stops to hold said pawls out of engagement with said collar in the normal position of said plate and having cam surfaces to retain one pawl out of engagement with said collar on movement of said plate in one direction from the normal position and to retain the other pawl out of contact on movement of the plate in the opposite direction from the normal position.

4. In apparatus for the controlled bending to predetermined conical form of flat arcuate bimetallic blanks of the type having a more plastic facing layer of sintered metallic material bonded to a less plastic backing layer of solid metal, the combination of a pair of rotatably supported opposing pressure rolls, one of which has a circumferential channel defined by a bottom forming the rolling surface of the roll for engagement with the backing layer of the blank and by outwardly extending side walls with each side wall comprising an inner portion disposed at right angles to the bottom of the channel and of a radial width to engage one edge of the backing layer only of the blank and an outer portion extending outwardly from said inner portion at a divergent angle to the plane thereof so that the top of said channel is wider than its bottom to afford clearance between the side walls of the channel and the edges of the facing layer of the blank; and independently adjustable means cooperating respectively with the opposite ends of the two rolls to urge them together with different predetermined forces.

5. Apparatus as claimed in claim 4 in which the angle of inclination of the outer side wall portion of the channel to the plane of the inner portion thereof is within the range of 4° to 15°.

6. Apparatus as claimed in claim 4 in which the angle of inclination of the outer side wall portion of the channel to the plane of the inner portion thereof is approximately 7°.

7. Apparatus as claimed in claim 4 in which the rolling surface of the channel roll is of conical shape.

8. The method for the controlled bending to a predetermined conical shape of a flat, arcuate blank of the type having a more plastic facing layer of sintered metallic material bonded to a less plastic backing layer of solid metal comprising the steps of providing a pair of operatively supported opposing rolls one of which has a rolling surface of conical shape corresponding to the predetermined finished shape of the blank; passing the blank lengthwise between the rolls with the backing layer in contact with the said conical rolling surface and with the arcuate blank edge of shorter radius disposed toward the smaller end of said rolling surface; meanwhile forcing the two rolls toward each other with yieldable pressure that is substantially constant at any point lengthwise of the rolls but increases from the larger end to the smaller end of the said conical rolling surface; and adjusting the intensity of the yieldable pressure to effect bending of the blank to conformity with the said conical rolling surface.

9. The method as claimed in claim 8 in which, during passage of the blank between the rolls, lateral guiding constraint is applied to the lateral edges of the backing layer only of the blank to bring each of said edges of the finished blank into a plane at right angles to the conical axis thereof.

SAMUEL K. WELLMAN.
FRANCIS J. LOWEY.

REFERENCES CITED

The following references are of record in the file of this patent:

UNITED STATES PATENTS

| Number | Name | Date |
|---|---|---|
| 432,625 | Kennedy | July 22, 1890 |
| 908,860 | Gustavsen | Jan. 5, 1909 |
| 1,295,614 | Scrimgeour | Feb. 25, 1919 |
| 1,350,057 | Bell | Aug. 17, 1920 |
| 1,367,015 | Browne | Feb. 1, 1921 |
| 1,406,895 | Reifurth | Feb. 14, 1922 |
| 1,921,486 | Seiferth | Aug. 8, 1933 |
| 2,056,409 | Ross | Oct. 6, 1936 |
| 2,152,611 | Swartz | Mar. 28, 1939 |
| 2,190,237 | Koehring | Feb. 13, 1940 |
| 2,219,665 | Simons | Oct. 29, 1940 |
| 2,254,674 | Christman | Sept. 2, 1941 |
| 2,446,892 | Lowey | Aug. 10, 1948 |